June 13, 1967 P. HELD 3,324,715
APPARATUS FOR MEASURING THE THERMAL POWER INPUT
OF A COMBUSTION CHAMBER
Filed March 16, 1964 2 Sheets-Sheet 1
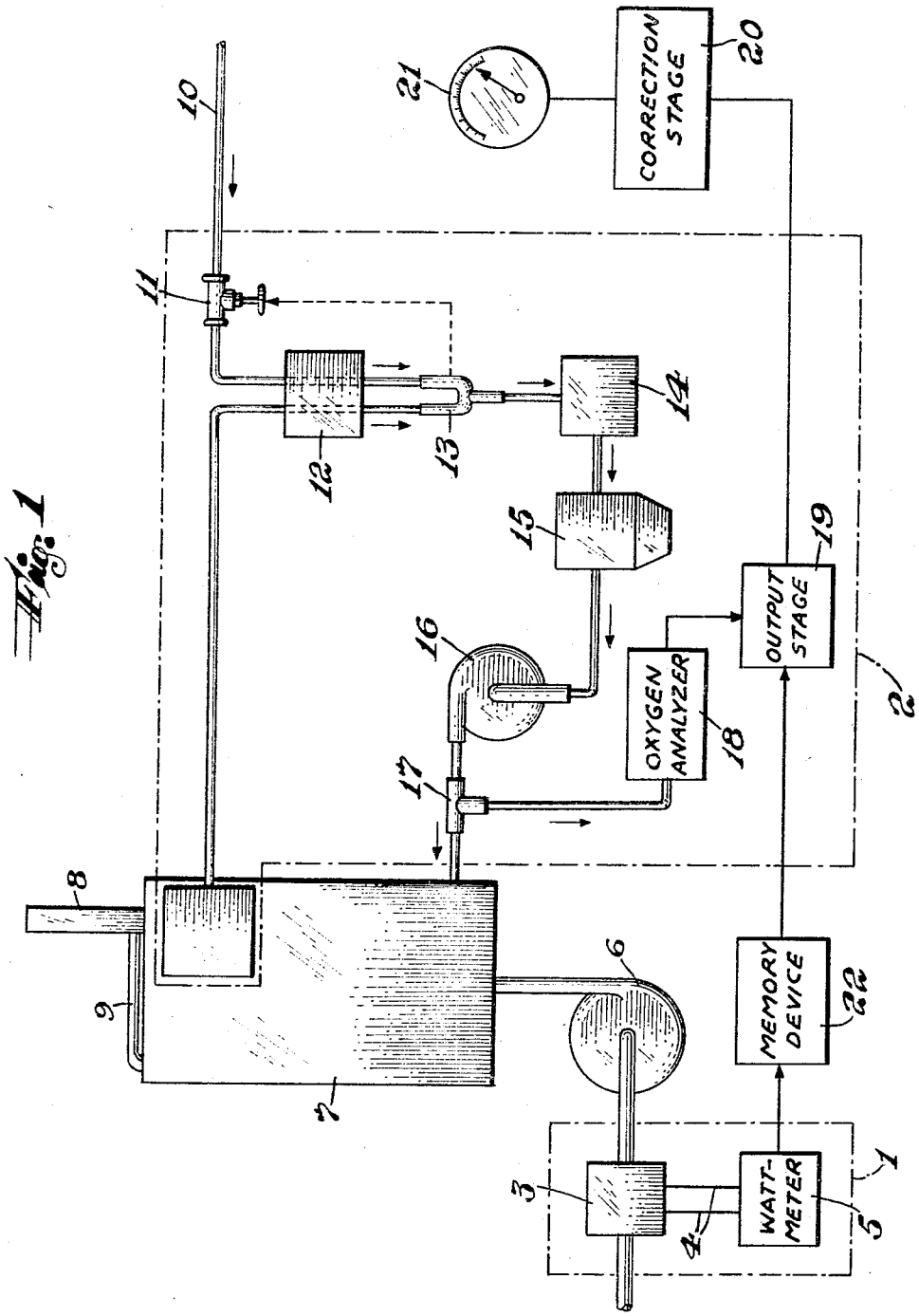
INVENTOR.
Pavel Held June 13, 1967 P. HELD 3,324,715
APPARATUS FOR MEASURING THE THERMAL POWER INPUT
OF A COMBUSTION CHAMBER
Filed March 16, 1964 2 Sheets-Sheet 2
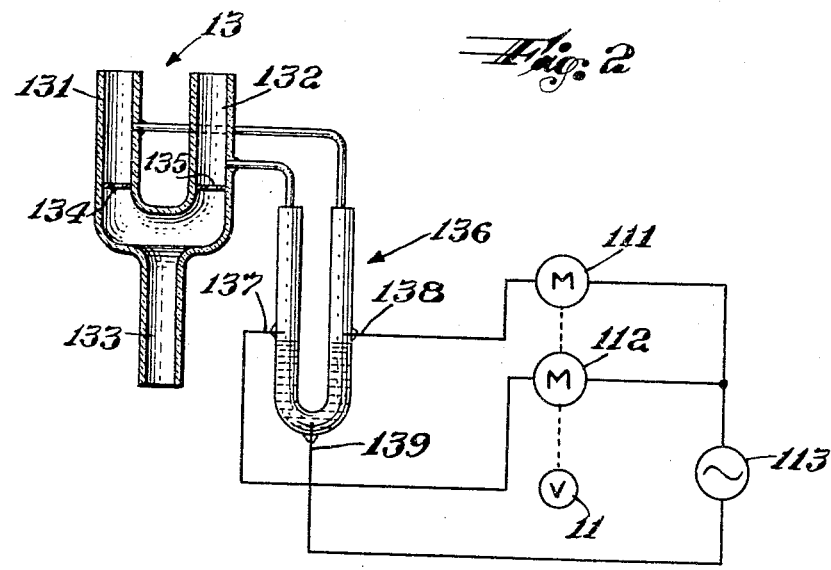
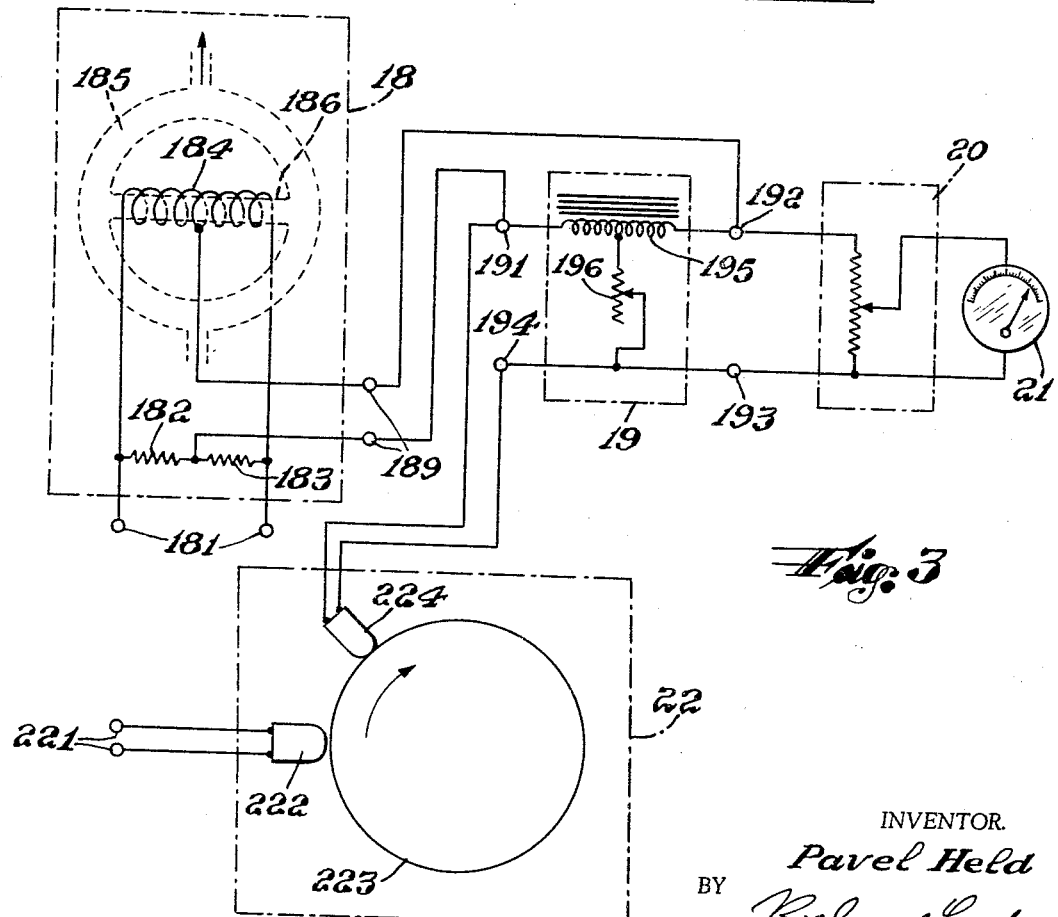
INVENTOR.
Pavel Held

United States Patent Office 3,324,715
Patented June 13, 1967

3,324,715
APPARATUS FOR MEASURING THE THERMAL
POWER INPUT OF A COMBUSTION CHAMBER
Pavel Held, Prague, Czechoslovakia, assignor to Výzkumný ústav energetický, Prague, Czechoslovakia
Filed Mar. 16, 1964, Ser. No. 352,254
2 Claims. (Cl. 73—112)

This invention relates to the continuous measurement of the thermal power input to the combustion chamber of a boiler or furnace, and more particularly to a measurement method and apparatus which are applicable to the combustion of comminuted solid fuels such as powdered coal.

Devices for measuring the power output of a boiler with adequate accuracy are readily available. The apparatus of the invention when combined with a known device for measuring power output permits a continuous thermal balance of the boiler to be recorded or indicated, and the efficiency of fuel combustion may be monitored in a manner not heretofore available.

The thermal power input of coal burning installations is conventionally determined by measuring the weight of the fuel consumed and by analyzing fuel samples for their calorific value. It is difficult to weigh powdered coal as it is delivered from a continuous grinder to the combustion chamber, and the measurements obtained on known devices have an error margin of 7 to 10%. When the material fed to the grinder is weighed, the lag between weighing and actual combustion introduces an error which is not readily evaluated nor controlled. It is not usually practical to determine the calorific value of the coal more than once in a shift while the calorific value of the material burnt between consecutive samplings may vary as much as 20 percent.

The sample employed for the determination of calorific value is normally of the order of one gram. In an installation consuming several hundred tons of coal per shift, even sophisticated sampling techniques cannot ensure a reasonably close relationship between the properties of the sample and those of the fuel consumed. If human error is taken into account, the reliability and accuracy of the methods employed heretofore for measuring thermal input of a combustion chamber leave much to be desired.

The primary object of the invention is the provision of a continuous indication of thermal input to a furnace or boiler which is free from the shortcomings enhmerated above.

The method of the invention is based on the known fact that the amount of heat developed by the complete combustion of an industrial carbonaceous fuel is fairly precisely proportional to the weight of air employed in the combustion. The proportionality factor $K$ varies between 710 and 770 kilogram calories per kilogram of air for the several fuels conventionally employed. The error introduced by assuming $K$ to be equal to 740 kg.-cal./kg. is therefore no more than ±5%. An even smaller margin of error of such measurements is lower by an constant value of $K$ which is selected for a particular type of fuel, such as bituminous coal, lignite, fuel oil, or natural gas. Within each of these classes of fuels, $K$ does not vary by more than ±2%.

A measurement of thermal input may therefore be derived from a determination of the weight of air required for complete combustion of the fuel. The inherent margin of error of such measurements is lower by an order of magnitude than the error of the known methods.

It is not sufficient to measure the amount of air actually supplied to a combustion chamber. Fuel is only partially burnt in industrial installations, and the actual amount of air supplied or consumed therefore does not provide a significant measurement of thermal input.

According to one aspect of this invention, the weight of the air of combustion fed to the furnace or boiler is measured, and the ratio between the amount of air supplied and the amount of air required for complete combustion of the simultaneously supplied fuel is ascertained. This ratio will be referred to hereinafter as the "factor of air excess."

If the rate of air flow into the combustion chamber is $V$ kg./sec., the factor of air excess is $\alpha$, $K$ is the proportionality factor described above, and $Q$ is the thermal heat input that it is desired to determine, then $$Q = V \times K \times 1/\alpha \text{ kg.-cal./sec.} \qquad (1)$$

The apparatus required for determining $Q$ may thus mainly consist of two elements, one being a flow meter which indicates air flow in units of weight per time, such as a conventional Thomas meter. The second element is an apparatus for determining the factor of air excess.

The simultaneous readings of air flow and factor of air excess may be evaluated from time to time by means of tables or graphs based on Equation 1, and the indication of thermal input obtained may be adequate for power units of small or intermediate size. In large installations, electrical or other signals representative of flow rate and factor of air excess may be derived from the flow meter and from a special analysis unit, and may be fed continuously to an analog computer the output of which may be recorded in units of thermal power input rate.

The exact nature of this invention as well as other objects and advantages thereof will be readily apparent from consideration of the following specification relating to the annexed drawing in which:

FIG. 1 diagrammatically illustrates an apparatus of the invention;

FIG. 2 shows a feedback arrangement for controlling secondary air of combustion in the apparatus of FIG. 1; and FIG. 3 illutrates the output stage of the apparatus of FIG. 1 in more detail.

Referring now to the drawing in detail, and initially to FIG. 1, there is shown a flow meter unit 1 consisting of a Thomas calorimetric gas meter 3 connected to a telemetering wattmeter 5 by conductors 4. The signal generated by the wattmeter 5 is delayed in a magnetic memory device 22 of the conventional type in which a drum or disc having a magnetizable peripheral portion is rotated by a constant speed motor, and a recording head, a reading head, and an erasing head are spacedly arranged in sequence along the magnetizable periphery of the disc or drum. The output signal of the wattmeter 5 is thus recorded in the memory device by the recording head and taken off by the reading head after a delay determined by the rotary speed of the disc or drum, and by the angular spacing of the recording and reading heads. The recorded signal is erased after reading. The output signal of the reading head is fed to an analysis unit 2.

Air of combustion is drawn from the atmosphere by a blower 6 through the flow meter unit 1, and is fed under pressure to the combustion chamber 7 which also receives fuel, such as powdered coal in a conventional manner, not further illustrated. A sampling tube 9 is arranged near the flue 8 of the chamber 7 to withdraw a stream of material from the combustion products about to leave the furnace.

The sample of combustion products is passed through a heat exchanger 12 in which it is cooled by thermal contact with metered secondary air of combustion which enters the heat exchanger 12 from the atmosphere through a motor driven metering valve 11. The combustion products and the secondary air are mixed in a vessel 13, described in more detail with reference to FIG. 2, and the mixture is fed to a furnace 14 in which the combustible residue in the sample is completely oxidized.

The fully oxidized material and an unreacted portion of the secondary air are passed through a cyclone type dust collector 15 in which ash is separated from the gaseous components of the mixture before is passes through a blower 16. The blower produces the draft necessary for sampling and for drawing secondary air into the mixing vessel 13, and returns the gaseous portion of the material discharged from the furnace 14 to the combustion chamber 7 through the straight channel of a T-fitting 17.

A small part of the stream of gas discharge by the blower 16 is permitted to flow from a side tube of the fitting 17 through an automatic magnetic oxygen analyzer 18. The analyzer is of the commercially available annulus type described in "The Instrumental Manual," 3rd ed., United Trade Press Ltd., London, 1960, pages 600 and 601. The analyzer yields an electrical signal directly proportional to the oxygen content of the analyzer gas mixture. The instrument is sensitive to the paramagnetic properties of oxygen.

The signals of the memory device 22 and of the oxygen analyzer 18 are combined in the output stage 19 of the analysis unit 2 in a manner more fully described hereinafter with reference to FIG. 3 of the drawing. The output signal of the analysis unit is modified in a correction stage 20 which may include an amplifier and controls for modifying the output signal for a selected value of the proportionality factor K. The modified signal is fed to an indicating and recording instrument conventionally shown at 21. The instrument may be directly calibrated in kg.-cal./sec. or in other units of rate of thermal input.

The mixing vessel 13 and associated elements of the analysis unit 2 are shown conventionally in FIG. 2. The vessel is a Y-tube whose intake branches 131, 132 are connected to the heat exchanger 12 for receiving combustion products and secondary air having the same temperature. The discharge conduit 133 of the vessel 13 communicates with the blower 16. The pressure within the mixing vessel thus drops in a direction from the branches 131, 132 to the discharge conduit 133. This pressure drop is enhanced by apertured plates 134, 135 in the branches 131, 132. The portions of these branches ahead of the plates communicate with the vertical legs of a U-tube 136. The bight portion of the U-tube 136 and the lower portions of the legs are filled with mercury, and two contacts 137, 138 are arranged in the legs of the U-tube. The contacts are barely above the surface of the mercury when the mercury level is the same in both legs. The contacts 137, 138 are arranged in series with motors 111, 112 of the valve 11 which respectively open and close the valve when energized by a source of current 113 conductively connected to the motors and to a contact 139 permanently submersed in the mercury in the bight portion of the U-tube 136.

As long as the pressure drop across the apertured plates 134, 135 is the same, both motors 111, 112 are idle. When the flow of air from the valve 11 through the branch 132 increases, the pressure drop across the plate 135 increases, and the mercury in the U-tube 136 is shifted to close the energizing circuit of the motor 111, and thereby to throttle the air supply at the valve 11 until the desired equilibrium condition is restored.

The mixing vessel 13, the valve 11, and the feedback loop which connects them thus automatically maintain a mixture of combustion products and of secondary air in a desired ratio determined by the apertures in the plates 134, 135. Equal apertures have been illustrated, and a mixture of equal parts of air and combustion products is produced by the mixing arrangement specifically illustrated.

With a blower 16 having a substantially uniform output, the feedback loop and the motors 111, 112 may normally be dispensed with without introducing a source of appreciable error. The valve 11 may be set manually to a desired ratio of secondary air and combustion products, and this ratio is not normally affected to a significant extent by variations in atmospheric pressure, fuel combustion, and combustion chamber operation.

The furnace 14 is externally heated by electric heating elements or by gas flames to a temperature sufficiently high to ensure complete combustion of all carbonaceous material to water and carbon dioxide. Inorganic ash is separated from the gaseous combustion products in the dust collector 15. The capacity of the blower 16 is selected to maintain an adequate flow velocity of the gases in the dust collector so that all solid particles are precipitated by centrifugal action. A flow rate of 10 to 20 meters per second is adequate for the purpose. A high flow velocity in the sampling loop from the tube 9 to the dust collector 15 is desirable also because it prevents unburned solid fuel particles from settling in the sampling loop ahead of the combustion furnace 14. A conventional water seal (not illustrated) at the bottom of the dust collector 15 permits the removal of collected solid matter.

With a rapid flow of material through the sampling loop, the time elapsed between entry of a specific batch of combustion products into the tube 9 and the feeding of the corresponding fully oxidized gaseous material to the oxygen analyzer 18 need not be more than one to two seconds.

The amount of secondary air supplied is chosen in such a manner that an excess of oxygen is always present in the material fed to the oxygen analyzer 18. Under this condition, the results obtained by the apparatus of the invention are entirely independent of the manner in which the combustion chamber 7 is operated. More specifically, the thermal power input indication produced by the apparatus does not depend on complete combustion of fuel in the chamber 7. Complete combustion of fuel in the chamber 7 will be assumed for the sake of simplicity in the following calculation of the factor of air excess in the apparatus of FIG. 1.

With complete combustion, the combustion products withdrawn from the chamber 7 through the tube 9 are free from residual combustible matter. The oxygen content of the sampled combustion products is $$O_1 = 0.21 \frac{\alpha - 1}{\alpha} \qquad (2)$$

when the sample is diluted with an equal amount of air in the mixing vessel 13, the oxygen content of the mixture is $$O_2 = \frac{1}{2}(0.21 + O_1) = 0.105 \frac{2\alpha - 1}{\alpha} \qquad (3)$$

No change in oxygen content occurs during passage through the furnace 14. The effluent gas from the furnace 14 thus has an oxygen content $$O_3 = O_2 = 0.105 \frac{2\alpha - 1}{\alpha} \qquad (4)$$

Equation 4 may be solved for $1/\alpha$:

$$1/\alpha = 2\left(1 - \frac{O_3}{0.21}\right) \qquad (5)$$

The amount of air actually fed to the combustion chamber 7 is multiplied by $1/\alpha$ to arrive at the amount of air necessary for completely burning the fuel simultaneously supplied to the chamber 7. The manner in which a signal indicative of thermal power input can be derived from the output signals of the memory device 22 and of the analyzer 18 in an output stage 19 is illustrated in FIG. 3.

The output of the wattmeter 5 is fed to the terminals 221 of a recording head 222 in the magnetic memory device 22. The head 222 records the signal on a magnetizable drum 223 which is rotated at a fixed speed in the direction of the arrow. The signal recorded by the head 222 is read with a predetermined delay by a reading head 224 and is thereafter erased in a conventional manner, not illustrated. The output signal of the head 224 is fed to terminals 191 and 194 of the output stage 19 of the analysis unit.

The conventional, annulus-type, magnetic oxygen analyzer 18 has input terminals 181 which are connected to a source of direct current. Two resistors 182, 183 are arranged in series across the terminal 181. The terminals are also connected by a winding 184 about a thin-walled glass tube 186 which bridges a horizontal diameter of the annular cell 185. A center top of the winding 184 and the linked terminals of the resistors 182, 183 are respectively connected to the two output terminals 189 of the analyzer.

The output terminals 189 of the analyzer 18 are connected to the terminals 191 and 192 of the output stage 19. The output stage 19 includes a coil 195 which is equipped with an iron core and connects the terminals 191, 192. Its impedance is approximately 100 times the impedance of the oxygen analyzer 18 as measured between the terminals 189. The coil 195 has a center tap which is connected to the terminal 194 and to a connected terminal 193 by a variable resistor 196 having a maximum impedance equal to about one-quarter of the impedance of the analyzer 18.

The correction stage 20 is a voltage dividing potentiometer whose fixed terminals are connected to the terminals 192, 193 of the output stage 19. The instrument 21, of which only an indicating dial and hand are shown in FIG. 3, is connected to the moving contact and to one of the terminals of the potentiometer 20.

The signal generated in the output 19 is further modified in the correction stage 20 to make the modified signal consistent with the calibration of the indicating and recording instrument 21 in a conventional manner.

The delay with which the air flow reading of the Thomas gas meter 3 is transmitted to the output stage 19 by the magnetic memory 22 is chosen in accordance with the characteristics of the oxygen analyzer 18 and other elements of the analysis unit 2 so that the signals received by the output stage 19 from the memory device 22 and the oxygen analyzer 18 pertain to simultaneous conditions in the combustion chamber 7. The proper setting of the memory device 22 is necessarily determined empirically. The delay may be of the odder of several tens of seconds.

The accuracy of the thermal power input valves obtained depends on the prevention of serious leaks in the combustion chamber 7 between the flow meter 3 and the sampling tube 9 which would admix additional oxygen to the combustion products. Such leaks are inconsequential in furnaces operated at super-atmospheric pressure.

The instrument 21 may be modified in any desired and conventional manner to give indications not only of the instantaneous thermal power input to the chamber 7, but also to integrate the instantaneous readings so that total power input over any desired period may be directly read.

It has been found that the overall range of error of the illustrated apparatus when employed in an industrial installation is approximately 3 to 4 percent. This accuracy is adequate to make the apparatus useful for automation of the combustion chamber operation. More specifically, a power input signal derived from the output stage 19, the correction stage 20, or the instrument 21 in a conventional manner may be employed to control the supply of coal to the non-illustrated grinder, the transfer of coal from the grinder to the furnace, and the supply of primary air of combustion in a feedback loop arrangement conventional in itself.

The power input signal may further be combined with a signal indicative of the power output of a boiler or other device operated by the combustion of fuel in the chamber 7 to give a continuous indication of overall instantaneous plant efficiency.

It should be understood, of course, that the foregoing disclosure relates to only a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. An apparatus for continuously determining the thermal power input of a combustion chamber continuously receiving air of combustion for reaction with a fuel, the apparatus comprising, in combination:
   (a) flow meter means for measuring the rate of air supply to said combustion chamber;
   (b) first signal generating means operatively connected to said flow meter means for generating a first signal in response to the rate measured;
   (c) sampling means for withdrawing a sample of combustion products from said chamber;
   (d) mixing means for admixing secondary air of combustion to the withdrawn sample in a fixed ratio;
   (e) furnace means for oxidizing combustible material in said withdrawn sample by means of said secondary air, whereby a completely oxidized mixture is obtained;
   (f) second signal generating means for generating a second signal in response to the oxygen content of said completely oxidized mixture, said furnace means being interposed between said mixing means and said second signal generating means;
   (g) third signal generating means operatively connected to said first and second signal generating means for generating a third signal in response to said first and second signals, said third signal being representative of the product of said measured flow rate and of a function $1/\alpha$ of said oxygen content, said function being derived from an equation $$\frac{1}{\alpha} = 2\left(1 - \frac{O_3}{0.21}\right)$$

wherein $O_3$ is said oxygen content; and
   (h) an instrument connected to said third signal generating means said instrument being responsive to said third signal for producing a perceptible indication of said third signal.

2. An apparatus as set forth in claim 1, further comprising signal delaying means interposed between said first and third signal generating means.

References Cited

UNITED STATES PATENTS 2,260,821   10/1941   Bendy _____ 23—254 X

RICHARD C. QUEISSER, *Primary Examiner.*

J. W. MYRACLE, *Assistant Examiner.*